United States Patent Office 3,461,158
Patented Aug. 12, 1969

---

3,461,158
PROCESS FOR PREPARING SORBIC ACID AND ITS SALTS
Lothar Hörnig, Frankfurt am Main, and Hermann Neu, Neu-Isenburg, Germany, assignors to Farbwerke Hoechst Aktiengesellschaft vormals Meister Lucius & Bruning, Frankfurt am Main, Germany, a corporation of Germany
No Drawing. Filed Nov. 16, 1965, Ser. No. 508,154
Claims priority, application Germany, Dec. 1, 1964, F 44,575
Int. Cl. C07c *51/00, 51/09*
U.S. Cl. 260—501.1    7 Claims

ABSTRACT OF THE DISCLOSURE

An improvement in a process for preparing sorbic acid and its salts by reacting crotonaldehyde and ketene to form a polyester, mixing the polyester with a catalyst and an inert solvent, heating the mixture to a temperature of 150° to 300° C. to thermally split the polyester and produce a distillate containing sorbic acid and recovering sorbic acid or a salt from the distillate is disclosed. The improvement comprises carrying out the splitting of the polyester in the presence of a secondary or tertiary aliphatic or alicyclic amine which boils at a temperature above 100° C. at atmospheric pressure.

---

The present invention relates to a process for preparing sorbic acid and its salts.

Various methods for the preparation of sorbic acid have been known. In a particularly economical process the starting material used is the polymeric reaction product (polyester) prepared by reacting crotonaldehyde and ketene according to the process described in British Patent 854,383 in an inert solvent in the presence of a catalyst comprising a fatty acid salt of a bivalent metal of subgroups II to VIII of the Periodic Table. From the polyester sorbic acid can be prepared in various ways.

One possibility is to saponify the polyester with an alkali liquor by heating whereupon the corresponding salts of the unsaturated β-hydroxy carboxylic acids form. By a subsequent treatment with an acid at an elevated temperature the hydrocarboxylic acids dehydrate to form a mixture of position-isomeric hexadiene carboxylic acids in which the trans-2-trans-4-hexadiene carboxylic acid (sorbic acid) is the main constituent. The polyester may also be converted directly into sorbic acid. For this purpose the polyester is treated at a temperature within the range of 70° to 80° C. with a strong mineral acid, in particular concentrated hydrochloric acid, without an isolation of salts of the unsaturated β-hydroxy carboxylic acids taking place. A third way of preparing sorbic acid consists in thermally splitting the polyester at a temperature within the range of 190° to 210° C. (cf. British Patent 854,383). As compared to saponification in an alkaline or acid medium the last-mentioned process has the advantage that considerable quantities of lye or acid can be saved. Besides, the elimination of waste waters having a high salt content can be dispensed with. The thermal splitting of the polyester is particularly advantageous when carried out in the presence of an inert solvent which under normal pressure boils at a temperature within the range of 150° to 300° C. and which simultaneously serves as solvent for the polyester and as entrainer for the sorbic acid distilled off from the heated mixture of polyester and solvent (cf. British Patent 854,383). If satisfactory yields are to be obtained in the thermal splitting a catalyst comprising an alkali metal hydroxide or a salt having an alkaline reaction and derived from an organic acid that is less strong than sorbic acid or alkali sorbate has to be added to the polyester or the mixture containing the polyester. When this process is carried out on an industrial scale the starting mixture consisting of polyester, entraining agent and catalyst is heated to a temperature within the range of 150° to 220° C., the mixture of hexadiene acids which forms by the splitting of the polyester being distilled off together with the inert solvent under a pressure that has been appropriately reduced. Depending on the quality of the crude product used different quantities of gaseous decomposition products, in particular unsaturated hydrocarbons and carbon dioxide, form during the thermal splitting of the polyester and are continuously drawn off through the device reducing the pressure (pump, steam ejector). In the reactor there is also formed a polymeric residue which under the working conditions is a viscous liquid which upon cooling solidifies to a brittle glass-like mass. In order to be able to handle the residue of the starting mixture more easily it is advantageous to add substances which liquefy the residue without distilling and without taking part in the reaction and which even after cooling keeps the residue in a flowable state (cf. German Patent 1,064,054).

The present invention provides a process for preparing sorbic acid and its salts by thermally splitting the polyester obtained from crotonaldehyde and ketene, the splitting of the polyester being carried out in the presence of a solvent which according to this process may be a secondary or tertiary aliphatic or alicyclic amine which under normal pressure boils at a temperature above 100° C. The yield of sorbic acid can be considerably increased when, instead of the alkali metal hydroxide or the metal salt having an alkaline reaction, an amine is used. Most of the amines that may be used here correspond to the formula

If the amine is a tertiary amine R, $R_1$ and $R_2$ represent equal or different alkyl or cycloalkyl groups. These groups may be interrupted by one or several oxygen atoms and/or one or more $>NR_3$ groups in which $R_3$ has the meaning of R but need not be identical with R. Each of the said oxygen atoms or $>NR_3$ groups has to be bound to two carbon atoms. If R, $R_1$ and $R_2$ are cycloalkyl groups they preferably form five- or six-membered rings. If $R_1$ and $R_2$ are alkyl groups they may be linked to an oxygen atom, a carbon atom, or a nitrogen atom to form a heterocyclic ring which preferably has five or six members, for example, a pyrrolidine, piperidine, piperazine or morpholine ring. R, $R_1$ and $R_2$ preferably contain less than 24 carbon atoms. But amines in which one or more of the groups bound to a secondary or tertiary nitrogen atom contain more than 24 carbon atoms may also be used. $R_1$, $R_2$ and $R_3$ may contain substituents that are inert towards the reaction, for example, aryl groups, alkoxy groups or aryloxy groups. They may also be substituted by primary amino groups or aryl amino groups which do not notably catalyze the thermal splitting and which in the present case are consequently to be regarded as groups that are inert towards the reaction.

If the amines are secondary amines R represents hydrogen.

Secondary amines in which a low alkyl group is bound to the secondary nitrogen atom are particularly efficient. The most efficient tertiary amines contain two low alkyl groups having preferably one to four carbon atoms and one of the above-mentioned long-chain groups.

The boiling point of the amines used, measured under normal pressure, is above 100° C., advantageously above 150° C. The amines may be used separately or in admixture with one another. They need not be present in pure form. Technically pure products or commercially available amine mixtures may also be used. As examples of suitable amines there may be mentioned methyl octadecylamine, dimethyl octadecyl amine, dibutyl dodecylamine, N,N',N,N'-tetramethyl hexamethylene diamine, N,N,N'-trimethyl-N-phenyl ethylene diamine, N-octadecyl pyrrolidine, N-octadecyl piperidine, N-dodecyl morpholine, N,N'-dipropylpiperazine, α-hexyl pyrrolidine, triethylene tetramine, ethyl-bis-[-β-ethyl aminoethyl-]amine, 1-octyl diethylene triamine, ethylene glycol-bis-[2-methyl aminoethyl ether] and mixtures thereof.

In the preparation of free sorbic acid which according to the invention is often preferred the polyester is mixed with the amine in an inert solvent which has a high boiling point and which, preferably, can simultaneously be used as entraining agent for sorbic acid. The amine is used in a quantity within the range of 0.5 to 10, preferably 2 to 5% by weight, calculated on the polyester. The amine may also be used in larger quantities. But then no additional technical advance in the art is otbained. As solvents may be used, for example, one or more of the hydrocarbons mentioned in British Patent 854,383, in particular aliphatic, alicyclic or aromatic hydrocarbons, the ethers thereof or nitro derivatives of aromatic hydrocarbons, for example, nitrobenzene or nitrotoluene. Under normal pressure these solvents boil at a temperature within the range of 150° to 300° C. The solvent is in general used in a quantity equal to 1 to 15 times the quantity by weight of the polyester.

The manner in which the amine is used depends on the special way in which the thermal splitting of the polyester is carried out. The amine may, for example, be dissolved in the mixture formed of the polyester to be reacted and the solvent, and the resulting solution may be introduced into the heated reactor. It is also possible, in particular in cases in which the process is carried out continuously, to introduce the amine directly in dosed quantities into the reactor or to place it first into the reactor and to recycle the amine-containing residue.

According to another mode of carrying out the process of the invention which leads to sorbic acid salts the amine is used in a larger quantity than the polyester. In most cases it is likewise used in a quantity equal to 1 to 15 times the quantity by weight of the polyester. The amine serves simultaneously as catalyst for the thermal splitting of the polyester and as entraining agent for the sorbic acid. When proceeding in this way amine and sorbic acid react and lead to the formation of the corresponding amino salt which is converted into the corresponding metal salt by means of an appropriate metal compound whereby the amine is set free again. Since the preparation of alkali metal salts, in particular that of potassium sorbate, and of alkaline earth metal salts, in particular that of calcium sorbate, which like sorbic acid itself are important as preservatives for foodstuffs, is of particular interest the amino salt of sorbic acid formed after the thermal splitting in solution of excess amine, is very often reacted in known manner with hydroxides, oxides, carbonates, bicarbonates or other salts of alkali or alkaline earth metals, which have an alkaline reaction. The amine that is set free is advantageously recycled.

As polyesters there are preferably used the reaction products which in the industrial manufacture of sorbic acid according to the process described in British Patent 854,383 are obtained from ketene and crotonaldehyde in the presence of a fatty acid salt containing at least 4 carbon atoms in the acid group and a metal of two or more valencies of subgroups II to VIII of the Periodic Table. There may also be used other polyesters obtained from ketene and crotonaldehyde, for example, polyesters of sulphur or sulphur compounds as are mentioned in Belgian Patent 659,747 which relates to a process for isomerizing hexadiene acids.

It is advantageous to split the polyester under reduced pressure and to distil the liberated sorbic acid simultaneously with the solvent serving as the entraining agent. It is most favorable to carry out the splitting at a temperature within the range of 160° to 220° C. and under a pressure within the range of 10 to 50 mm. of mercury.

As compared with the known catalysts for the splitting of polyesters the amines used according to the invention are distinguished by a higher efficiency and they consequently enable a higher yield of sorbic acid to be obtained under otherwise the same conditions. Besides, the quantity of gaseous decomposition products formed in the process according to the invention is considerably smaller than that formed in the known processes in which alkali metal hydroxide or salts having an alkaline reaction are used. So, the reduced pressure which has to be used can be produced by means of smaller aggregates which owing to the smaller amount of energy they require contribute to render the process more economical. The amines used according to the invention readily dissolve in the polyester, in the entraining agents that are suitable for use and in the mixtures of polyester and entraining agents, whereas the alkali metal hydroxides or alkali metal salts of organic acids which have hitherto been used dissolve or distribute with difficulty and consequently easily cause disturbances due to clogging of pipes, measuring apparatus or dosing instruments. Moreover, the amines promote the effect of the substances serving to liquefy the residues, so that these substances may be used in a considerably smaller quantity.

The following examples serve to illustrate the invention but they are not intended to limit it thereto.

The starting material used was a reaction product prepared in the manner described in British Patent 854,383 and containing a polyester. The reaction product also contained constituents that could not be converted into hexadiene acids, for example, diketene polymers and crotonaldehyde resins. The constituents that could be converted into hexadiene acids were determined by a careful esterification with butanol in the presence of concentrated sulphuric acid serving as the catalyst. In order to enable a better comparison to be obtained even in cases in which qualitatively different reaction products were used the yields of sorbic acid indicated in the examples are calculated on the portion of the polyester that can be converted into hexadiene acids. In the examples the term "grams of polyester" means the portion in grams of the constituents of the crude polyester that may be converted into hexadiene acids. This portion was determined in the following way:

100 grams of the commercially available reaction product of ketene and crotonaldehyde were boiled under reflux in an excess of toluene with 70 grams of butanol and 2 grams of concentrated sulphuric acid. Simultaneously, the water was continuously eliminated. When the reaction was terminated the toluene was distilled off and the hexadiene acid butyl ester was rectified in vacuo. 120 grams of hexadiene acid butyl ester boiling at 90° C. under a pressure of 5 mm. of mercury were obtained.

EXAMPLE 1

A mixture of 100 grams of polyester, 300 grams of diethylene glycol dibutyl ether and 5 grams of N-methyl octadecylamine was heated in a flask to 170° C. Simultaneously sorbic acid and solvent were distilled off under a pressure of about 20 mm. of mercury. After crystallization from the distillate 90 grams of sorbic acid were obtained.

EXAMPLE 2

A mixture of 100 grams of polyester, 300 grams of diethylene glycol dibutyl ether and 2 grams of dioctadecyl amine was treated in the manner described in Example 1. 92 grams of pure sorbic acid were obtained.

When the experiment was repeated under the same conditions, the only difference being that in one case 4 grams of dicyclohexylamine and in another case 3 grams of diethylene triamine were used as the catalyst, 90 and 91 grams, respectively, of pure sorbic acid were obtained.

EXAMPLE 3

A mixture of 100 grams of polyester, 200 grams of triethylene glycol diethyl ether and 2 grams of dimethyl octadecylamine was slowly dropped from a dropping funnel into a two-necked flask which was in a heating bath of 200° C. Sorbic acid and entraining agent were drawn off via a fractioning column under a pressure of about 20 mm. of mercury and condensed in a receiver. After crystallization 95 grams of pure sorbic acid were obtained.

EXAMPLE 4

A mixture of 100 grams of polyester, 200 grams of triethylene glycol diethyl ether and 3 grams of trioctadecyl amine was treated in the manner and under the conditions described in Example 3. 90 grams of pure sorbic acid were obtained.

When the experiment was repeated under the same conditions, the only difference being that 2 grams of dimethyl fatty acid amine which contained 4.2% of nitrogen and the fatty acid group of which contained 20 to 22 carbon atoms were used instead of trioctyl decylamine, 96 grams of pure sorbic acid were obtained.

EXAMPLE 5

A mixture of 100 grams of polyester and 100 grams of triethylene glycol diethyl ether were slowly introduced drop by drop from a dropping funnel into a three-necked flask which was in a heating bath of 190° C. A solution of 5 grams of trimethyl-N-phenyl ethylene diamine in 100 grams of triethylene glycol diethyl ether was slowly dropped in from a second dropping funnel. Sorbic acid and solvent were distilled off under a pressure within the range of 20 to 30 mm. of mercury through a fractionating column and condensed in a receiver. 91 grams of pure sorbic acid were obtained.

EXAMPLE 6

10 grams of a distillation residue formed in the technical preparation of octadecylamine (steryl amine) and having a nitrogen content of 3.5% were placed in a two-necked flask which was in a heating bath of 210° C. A mixture of 100 grams of polyester and 300 grams of diethylene glycol dibutyl ether was slowly dropped in from a dropping funnel. Sorbic acid and solvent were distilled off via a fractionating column under a pressure within the range of 30 to 40 mm. of mercury and condensed in a receiver. 93 grams of pure sorbic acid were obtained.

EXAMPLE 7

A mixture of 100 grams of polyester and 5 grams of octadecyl piperidine was introduced drop by drop from a heated dropping funnel into a three-necked flask which was in a heating bath of 200° C. Simultaneously 200 grams of triethylene glycol diethyl ether were introduced in dosed quantities into the flask from a second dropping funnel. Sorbic acid and solvent were distilled off via a fractionating column under a pressure of about 20 mm. of mercury and condensed in a receiver. After working up of the condensate 87 grams of pure sorbic acid were obtained.

EXAMPLE 8

15 grams of the amine-containing residue which was obtained in the experiment described in Example 2 in which dioctadecylamine was used as the catalyst were placed in a two-necked flask which was in a heating bath of 200° C. A mixture of 100 grams of polyester and 300 grams of diethylene diglycol butyl ether was added drop by drop from a dropping funnel. Sorbic acid and solvent were distilled off via a fractioning column. From the distillate 89 grams of pure sorbic acid were obtained.

EXAMPLE 9

100 grams of polyester were dissolved in 300 grams of tricyclohexylamine. The mixture was introduced drop by drop into a flask heated to 180° C. Sorbic acid and amine were distilled off via a fractionating column under a pressure of about 25 mm. of mercury. The distillate was treated in known manner with aqueous potassium hydroxide solution whereupon the potassium salt of sorbic acid was obtained. 120 grams of potassium sorbate were obtained. The tricyclohexyl amine which was set free was returned to the reaction zone.

EXAMPLE 10

(a) A mixture of 100 grams of polyester, 300 grams of triethylene glycol diethyl ether and 3 grams of octadecyl piperidine was introduced in dosed quantities from a dropping funnel into a two-necked flask which was in a heating bath of 200° C. Sorbic acid and entraining agent were distilled off via a fractionating column under a pressure of about 20 mm. of mercury. The receiver was connected with a cooling trap serving for the condensation of the readily volatile constituents. The residual gas was measured on the delivery side of the pump by means of a gas meter. 91 grams of pure sorbic acid were isolated from the distillate. 3 grams of waste gas comprising piperylene and carbon dioxide were formed.

(b) When the experiment described under (a) was repeated, under the same conditions, the only difference being that instead of the amine 3 grams of potassium sorbate were used, only 82 grams of pure sorbic acid but 10 grams of waste gas comprising piperylene and carbon dioxide were obtained.

We claim:

1. In a process for preparing sorbic acid and its salts which comprises reacting crotonaldehyde and ketene to form a polyester, mixing the polyester with a catalyst and inert solvent, heating the mixture to a temperature of 150° to 300° C. to thermally split said polyester and produce a distillate containing sorbic acid, and recovering sorbic acid or a salt thereof from said distillate, the improvement which comprises carrying out the splitting of said polyester in the presence of a secondary or tertiary aliphatic or alicyclic amine which boils at a temperature above 100° C. at a atmospheric pressure.

2. A process according to claim 1 and wherein the boiling point of the amine is above 150° C.

3. A process as claimed in claim 1 wherein the amine is used in a concentration within the range of 0.5 to 10% by weight, calculated on the polyester.

4. A process according to claim 1 and wherein the solvent used is an aliphatic, alicyclic or aromatic hydrocarbon or chloro, bromo or nitro derivative thereof or an ether having a boiling point of 150° to 300° C. at atmospheric pressure.

5. A process according to claim 1 and wherein the quantity of amine is greater than that of the polyester, the amine serves as both catalyst and inert solvent, and the sorbic acid reacts with the amine to form an amine salt.

6. A process according to claim 5 and wherein the amine salt is reacted with an alkaline metal hydroxide, oxide or salt to form a sorbic acid salt of said metal and free amine.

7. A process according to claim 6 and wherein said free amine is recycled and admixed with the polyester to be thermally split.

References Cited

UNITED STATES PATENTS 3,021,365  2/1962  Fernholz.

FOREIGN PATENTS 883,492  11/1961  Great Britain.

LORRAINE A. WEINBERGER, Primary Examiner

M. G. BERGER, Assistant Examiner

U.S. Cl. X.R.

260—526, 535